(12) United States Patent
Kim et al.

(10) Patent No.: US 8,648,542 B2
(45) Date of Patent: Feb. 11, 2014

(54) BALLAST CIRCUIT FOR LED LAMP

(76) Inventors: Seong-Yoon Kim, Daegu (KR);
Duk-Young Kim, Daegu (KR)

(*) Notice: Subject to any disclaimer, the term of this patent is extended or adjusted under 35 U.S.C. 154(b) by 154 days.

(21) Appl. No.: 13/373,073

(22) Filed: Nov. 3, 2011

(65) Prior Publication Data

US 2012/0256551 A1 Oct. 11, 2012

(30) Foreign Application Priority Data

Apr. 5, 2011 (KR) .................. 10-2011-0031015

(51) Int. Cl.
*H05B 37/00* (2006.01)
*H05B 39/00* (2006.01)
*H05B 41/14* (2006.01)

(52) U.S. Cl.
USPC ............... 315/200 R; 315/185 R; 315/291; 315/307

(58) Field of Classification Search
None
See application file for complete search history.

(56) References Cited

U.S. PATENT DOCUMENTS

| 2009/0128050 | A1 | 5/2009 | Biebl et al. | |
| 2009/0295300 | A1* | 12/2009 | King | 315/209 R |
| 2010/0176744 | A1* | 7/2010 | Lee et al. | 315/294 |
| 2010/0225247 | A1 | 9/2010 | Hsueh et al. | |
| 2010/0277086 | A1 | 11/2010 | Chen et al. | |
| 2010/0289418 | A1* | 11/2010 | Langovsky | 315/210 |
| 2013/0100710 | A1* | 4/2013 | Kang et al. | 363/21.12 |

* cited by examiner

*Primary Examiner* — Jany Richardson
(74) *Attorney, Agent, or Firm* — WHGC, P.L.C.; John F. O'Rourke

(57) ABSTRACT

The ballast circuit for a light-emitting diode (LED lamp) includes a surge absorber circuit that includes a capacitor (C3) and a resistor (R3) serially connected between both ends of the bridge diode (BD), a resistor (R5) and a capacitor (C4) serially connected with each other, and a silicon controlled rectifier (SCR), the SCR being connected to the resistor (R5) and capacitor (C4) in parallel, the resistor (R5), capacitor (C4) and silicon controlled rectifier (SCR) being connected to the positive (+) terminal of the bridge diode (BD), thereby protecting the LED from a surge occurring. LED arrays connected to an output terminal of the surge absorber circuit, each array having a plurality of forward LEDs and LED arrays connected to the negative (−) terminal of the bridge diode (BD), each array having a plurality of reverse LEDs, the reverse LEDs being connected serially with one other.

1 Claim, 2 Drawing Sheets

BALLAST CIRCUIT FOR LED LAMP

TECHNICAL FIELD

The present invention relates to a ballast circuit for an LED lamp. And, more particularly, the present invention relates to a ballast circuit for an LED lamp, having a simple circuit construction of a silicon controlled rectifier SCR being a semiconductor switching device and an RC time constant circuit, that supplies a current to an LED (Light Emitting Diode) using an SCR after a predetermined time in the state that a power supply is applied, thereby protecting the LED from a surge voltage, a reverse voltage and rush current that occur when the power supply is applied, securing reliability of the LED that is very sensitive to an electrical shock by being completely independent from hindrance factors occurring when the power supply is applied, and embodying a higher efficiency characteristic almost without heat generation and energy loss.

BACKGROUND ART

Recently, as LED is variously produced due to the brilliant development of semiconductor technology, the trend is that LED whose power consumption needed to obtain the same illuminance as a general light bulb is no more than about 1/10 of it is applied to lamps for signboard, illumination and traffic lights However, a separate power supply device is needed to drive the lighting that uses LED.

That is, the lighting that uses a general bulb in the art does not need a separate power supply device since it uses an alternating AC power supply of 220V. However, since the LED uses direct DC power supply, SMPS should be installed in order to rectify the commercial alternating power supply of 220V into a direct voltage and convert the rectified direct voltage into a direct voltage having a magnitude required to turn on the lighting diode.

However, when a general SMPS scheme is adopted, a power-factor controller is used in the prior stage of the SMPS, so that the circuit itself not only is very complicated but also the device becomes large in volume since the circuit uses an inductor, an electrolytic condenser and so on.

Further, since the electrolytic condenser has the lifetime that is no more than 2 or 3 years, there is a problem that it is not suitable to the LED lamp that should have a long lifetime. Further, there is a problem that the circuit becomes more complicated by adding a noise filter to prevent a ripple voltage, which may cause an electro-magnetic interference EMI occurring when switching is made.

Additionally, in the ballast circuit for an LED lamp in the art, a DC constant-voltage circuit is constructed normally using SMPS, and a current limit resistor is used in each LED module to drive the LED stably.

However, since the SMPS is constructed of very precise and complicated circuits and should be switched at a high speed theoretically, there were problems that the SMPS might generate heat and noise easily, might be expensive and it was not easy to expect a high reliability and a long lifetime.

Meanwhile, while a simplified power supply device to drive simple electronic equipment by dropping voltage using resistors or capacitors without transformer in a commercial power supply is widely known in the name of so called "transless power supply" and partially used in door sensor lamp, remote control receiver and appliances controller, it is not possible to use the simplified power supply device as a stable power supply even though generally a constant-voltage diode or the like is additionally used since voltage fluctuations caused by the changed loads are severe, only a few current is flowed, and there is no countermeasure for kinds of noises coming in from the power supply.

Merely, when current is limited from the commercial power supply using a capacitor having a suitable capacitance and LEDs are serially connected, applied voltage has a characteristic that it is stably applied by a potential difference of PN junction x the number of LEDs in view of the characteristic of LED that is a kind of diode, and so there have been studies to utilize the characteristic. However, when the LED for illumination that is very sensitive to electrical shock and requires a long lifetime is directly connected to a commercial power supply without any protective circuit, the LED is broken due to surge voltage occurring when the power supply is applied and high frequency component noise that may be included in the power supply. Therefore, there is no industrial applicability although it may be possible experimentally.

Especially, when the LED is directly connected to the power supply by way of a capacitor and a bridge diode, it was known that the LED could not be protected effectively even though kinds of surge voltage control devices developed recently (for example, barrister, TVS diode, surge protector and so on) were applied according to experiment.

The ballast circuit for an LED lamp in the art that the applicant has suggested to solve the problems described above is connected to a current limit unit that is constructed of a capacitor C1 having a suitable capacitance correspondingly to characteristic of the alternating power supply AC 220V and a resistor R1 connected in parallel with the capacitor in order to charge and discharge on an end of the alternating power supply AC 220V in period of 60 Hz and control LED use current as illustrated in FIG. 1.

An output stage of the current limit unit is connected to the bridge diode BD that rectifies alternating voltage into direct voltage, the bridge diode BD is sequentially connected to a smoothing capacitor C2, a discharge resistor R2, and a surge absorber formed of a capacitor C3 and a resistor R3 that are serially connected with each other between both ends of the bridge diode BD, and an output end of the bridge diode BD is serially connected to the LED protection resistor R4.

Further, a positive (+) terminal of the bridge diode BD is connected to LED arrays (DA1, DA2, ... DAn) in which plural forward LEDs are serially connected with one another, and a negative (−) terminal of the bridge diode BD is connected to LED arrays (DA11, DA12, ... DA1n) in which plural reverse LEDs are serially connected with one another.

However, while the smoothing capacitor C2 and discharge resistor R2 are additionally connected to cut off high frequency noise components coming in from the power supply and provide current to the LED arrays (DA1, DA2, ... DAn) and LED arrays (DA11, DA12, ... DA1n) stably in the ballast circuit for a LED lamp in the art illustrated in FIG. 1, since there are concerns that rush current flows in the capacitor C1 of the power supply and the smoothing capacitor C2 having a high capacitance and reverse voltage occurs when the power supply is applied and this shock may negatively affect lifetime of the LED arrays (DA1, DA2, ... DAn) and LED arrays (DA11, DA12, ... DA1n), a current limit resistor R4 is connected to the prior stage of the LED arrays (DA1, DA2, ... DAn) in order to alleviate such phenomenon.

However, since LED drive current always flows in the current limit resistor R4, there were problems that heat occurred and energy loss also occurred.

SUMMARY OF INVENTION

Technical Problem

Accordingly, the present invention provides a ballast circuit for an LED lamp, having a simple circuit construction of a silicon controlled rectifier SCR being a semiconductor switching device and an RC time constant circuit, that supplies a current to an LED using an SCR after a predetermined time in the state that a power supply is applied, thereby protecting the LED from a surge voltage, a reverse voltage and rush current that occur when the power supply is applied, securing reliability of the LED that is very sensitive to an electrical shock by being completely independent from hindrance factors occurring when the power supply is applied, and embodying a higher efficiency characteristic almost without heat generation and energy loss.

Solution to Problem

According to an aspect of the present invention, there is provided a ballast circuit for an LED lamp including a current limit unit that is constructed of a capacitor C1 and a resistor R1 connected in parallel with each other to be charged and discharged in 60 Hz of alternating power source AC 220V and to control LED used current, and a bridge diode BD that rectifies an alternating voltage passed through the current limit unit into a direct voltage, the ballast circuit including a surge absorber circuit that includes a capacitor C3 and a resistor R3 serially connected between both ends of the bridge diode BD, a resistor R5 and a capacitor C4 serially connected with each other, and a silicon controlled rectifier SCR, the SCR being connected to the resistor R5 and capacitor C4 in parallel, the resistor R5, capacitor C4 and silicon controlled rectifier SCR being connected to the positive (+) terminal of the bridge diode BD, thereby protecting the LED from a surge occurring when power is turned on or off; LED arrays connected to an output terminal of the surge absorber circuit, each array having a plurality of forward LEDs, the forward LEDs being connected serially with one another; and LED arrays connected to the negative (−) terminal of the bridge diode BD, each array having a plurality of reverse LEDs, the reverse LEDs being connected serially with one other.

Advantageous Effects of Invention

According to a ballast circuit for an LED lamp of the present invention constructed as such, there is an effect that a simple circuit construction of a silicon controlled rectifier SCR being a semiconductor switching device and an RC time constant circuit supplies a current to an LED (Light Emitting Diode) using an SCR after a predetermined time in the state that a power supply is applied, thereby protecting the LED from a surge voltage, a reverse voltage and rush current that occur when the power supply is applied, securing reliability of the LED that is very sensitive to an electrical shock by being completely independent from hindrance factors occurring when the power supply is applied, and embodying a higher efficiency characteristic almost without heat generation and energy loss.

Further, according to the present invention, there is an effect that a surge absorber circuit constructed of a resistor and a capacitor is simple and cheap.

Further, according to the present invention, since current is supplied to the LED with a predetermined time gap from power supply application using a time constant circuit constructed of a resistor and a capacitor connected serially, it is possible to double-protect the LED, thereby providing a ballast circuit for an LED lamp with high reliability and efficiency almost without power loss.

Further, according to the present invention, it is possible to increase area of a heat radiating plate when especially manufacturing a bulb type LED lamp in which a control circuit should be installed in a narrow area since parts are small in number and circuit itself is small in volume, thereby improving lifetime and reliability of bulb with an efficient discharging and remarkably lowering the cost.

BRIEF DESCRIPTION OF DRAWINGS

The accompanying drawings, which are included to provide a further understanding of the disclosure and are incorporated in and constitute a part of this application, illustrate embodiments of the disclosure and together with the description, serve to explain the principle of the disclosure. In the drawings.

DESCRIPTION OF EMBODIMENTS

Hereinafter, embodiments of the present disclosure will be described with reference to the accompanying drawings as follows.

Figure 2:
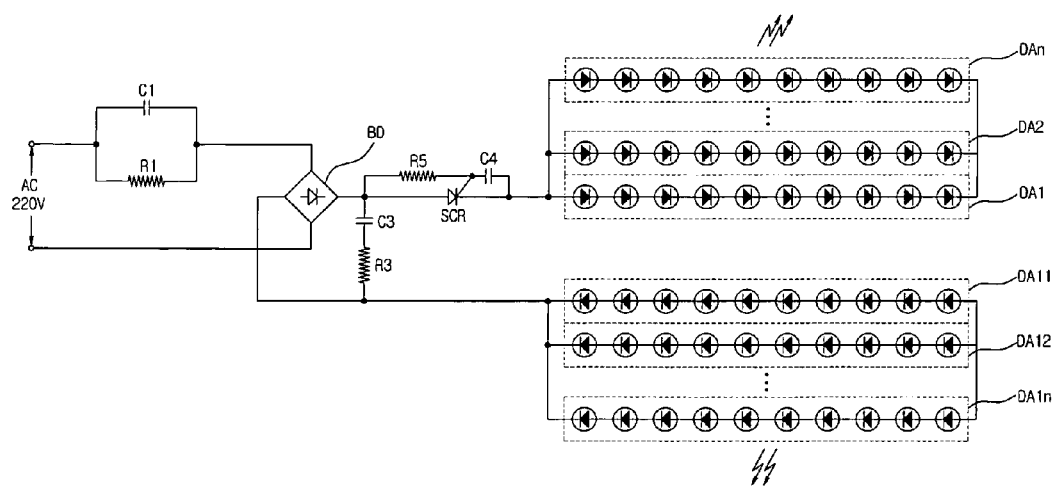
FIG. 2 is a circuit diagram illustrating a ballast circuit for an LED lamp according to the present invention.

FIG. 2 is a circuit diagram illustrating a ballast circuit for an LED lamp according to the present invention.

Referring to FIG. 2, the ballast circuit for an LED lamp includes a current limit unit that is constructed of a capacitor C1 and a resistor R1 connected in parallel with each other to be charged and discharged in 60 Hz of alternating power source AC 220V and to control LED used current, and a bridge diode BD that rectifies an alternating voltage passed through the current limit unit into a direct voltage, a surge absorber circuit that includes a capacitor C3 and a resistor R3 serially connected between both ends of the bridge diode BD, a resistor R5 and a capacitor C4 serially connected with each other, and a silicon controlled rectifier SCR, the SCR being connected to the resistor R5 and capacitor C4 in parallel, the resistor R5, capacitor C4 and silicon controlled rectifier SCR being connected to the positive (+) terminal of the bridge diode BD, thereby protecting the LED from a surge occurring when power is turned on or off; LED arrays (DA1, DA2 . . . DAn) connected to an output terminal of the surge absorber circuit, each array having a plurality of forward LEDs, the forward LEDs being connected serially with one another; and LED arrays (DA11, DA12 . . . DA1n) connected to the negative (−) terminal of the bridge diode BD, each array having a plurality of reverse LEDs, the reverse LEDs being connected serially with one other.

An operation of the ballast circuit for an LED lamp according to the present invention constructed as above will be described with reference to the accompanying FIG. 2 as follows.

Figure 1:
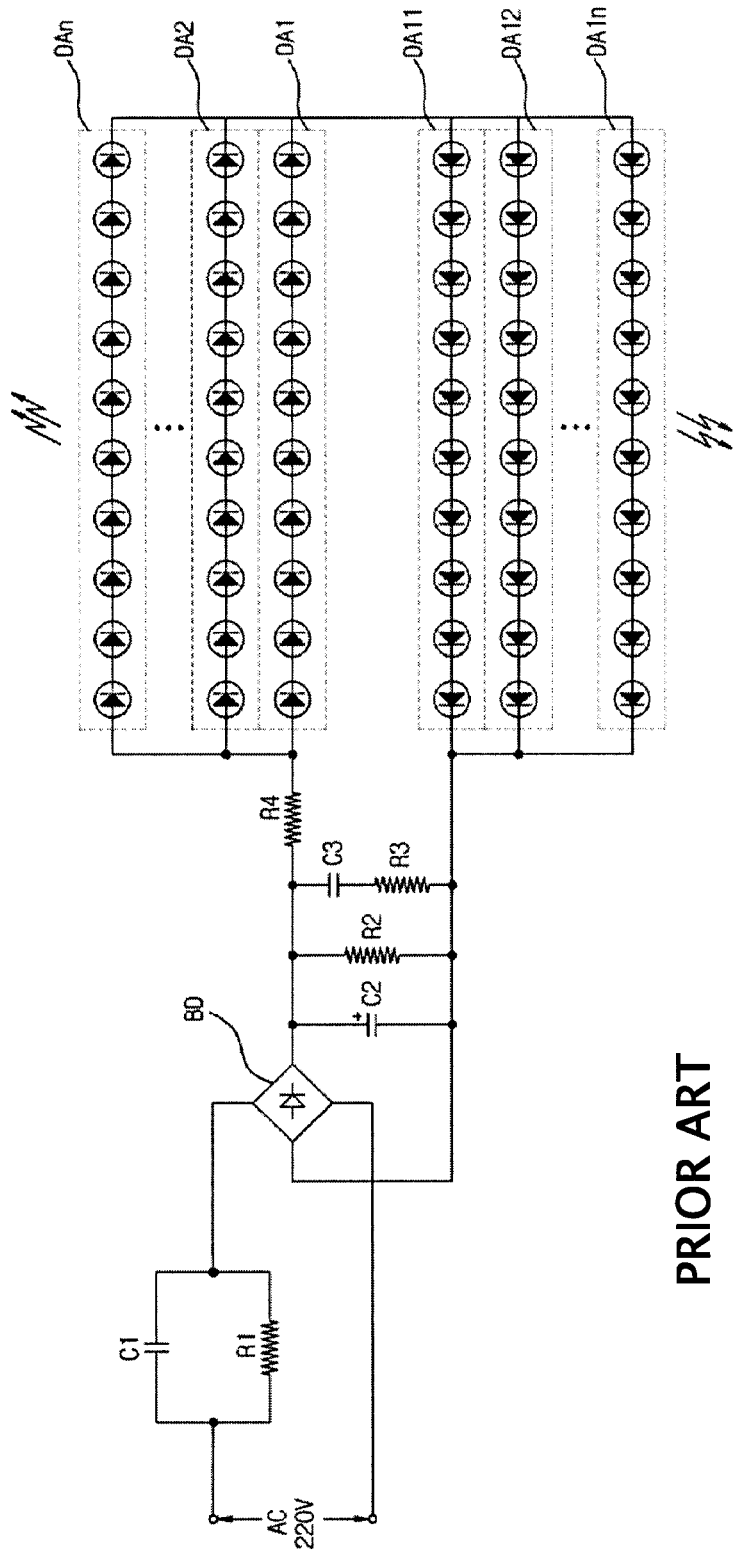
FIG. 1 is a circuit diagram illustrating a ballast circuit for an LED lamp in the art.

First, the ballast circuit for an LED according to the present invention illustrated in FIG. 2 omits a smoothing capacitor C2, a discharge resistor R2 and a current limit resistor R4 from the construction illustrated in FIG. 1 in the art, and instead has a silicon controlled rectifier SCR which is a switching device and a resistor R5 and a capacitor C4 which form a time constant circuit, the switching device and time constant circuit being serially connected, so that LED current is supplied to the silicon controlled rectifier SCR after a predetermined time in the state that the power source is applied, thereby protecting the LED from a surge voltage, a reverse voltage and a rush current occurring when the power supply is applied.

An operation of the ballast circuit for an LED lamp according to the present invention constructed as such is described as follows. When an initial power supply AC 220 V is applied, low level current flows to charge the capacitors C3 and C4 through the resistors R3 and R5 and driving current is cut off by the silicon controlled rectifier SCR that is in a turn-off state. And, the resistor R5 and the capacitor C4 absorbs the surge voltage together with the resistor R3 and the capacitor C3 and the silicon controlled rectifier SCR cuts off a reverse voltage.

When the power source voltage is in a stable state after a predetermined time, and the voltage of the capacitor C4 is increased so that the gate of the silicon controlled rectifier SCR is in a turn-on state, a driving current is supplied to LED arrays (DA1, DA2, . . . DAn) and LED arrays (DA11, DA12 . . . DA1n). At this time, since a switching is performed by the silicon controlled rectifier SCR that is a semiconductor switching device, the surge voltage does not occur, thereby having no negative influence on LED arrays (DA1, DA2, . . . DAn) and LED arrays (DA11, DA12, . . . DA1n).

Accordingly, the ballast circuit for an LED lamp according to the present invention has no problem when driving LED devices used for illumination that are extremely sensitive to the surge current.

According to experiments, it was possible to manufacture a high efficient LED lamp having about 7 W, efficiency of 98% and power-factor of 73% when 60 LEDs for illumination whose maximum rating is 60 mA at commercial power of AC 220V/60 Hz were serially connected with one another and value of the capacitor C1 was 1 μF, and it was known that the LED lamp had higher efficiency, lower heating, lower price and longer life time, compared with the existing product.

Further, since there is a lead effect in the present invention, it was known that the present invention had an advantage of improving power-factor generally when considering the commercial power in which lag occurs due to the many use of inductive loads such as transformer and motor.

Hereinbefore, while the embodiments of the present disclosure are described, they are exemplary ones only and one of ordinary skill in the art may recognize that various alterations and modifications that fall within the scope of the present disclosure may be possible. Accordingly, the true technical protection scope of the present disclosure should be defined by the following claims.

| [Reference Sings List] | |
| --- | --- |
| C1: capacitor (current limit resistor) | C3: capacitor |
| C4: capacitor | R1: resistor |
| R3: resistor | R5: resistor |
| SCR: silicon controlled rectifier | BD: bridge diode |
| DA1, DA2, . . . DAn: LED arrays | DA11, DA12, . . . DA1n: LED arrays |

The invention claimed is:

1. A ballast circuit for an LED lamp including a current limit unit that is constructed of a capacitor (C1) and a resistor (R1) connected in parallel with each other to be charged and discharged in 60 Hz of alternating power source (AC 220V) and to control LED used current, and a bridge diode (BD) that rectifies an alternating voltage passed through the current limit unit into a direct voltage, the ballast circuit comprising:

a surge absorber circuit that includes a capacitor (C3) and a resistor (R3) serially connected between both ends of the bridge diode (BD), a resistor (R5) and a capacitor (C4) serially connected with each other, and a silicon controlled rectifier (SCR), the SCR being connected to the resistor (R5) and capacitor (C4) in parallel, the resistor (R5), capacitor (C4) and silicon controlled rectifier (SCR) being connected to the positive (+) terminal of the bridge diode (BD), thereby protecting the LED lamp from a surge occurring when power is turned on or off;

first LED lamp arrays (DA1, DA2 . . . DAn) connected to an output terminal of the surge absorber circuit, each first array having a plurality of forward LEDs, the forward LEDs being connected serially with one another; and second LED lamp arrays (DA11, DA12 . . . DA1n) connected to the negative (−) terminal of the bridge diode (BD), each second array having a plurality of reverse LEDs, the reverse LEDs being connected serially with one other.

* * * * *